Figure 1:
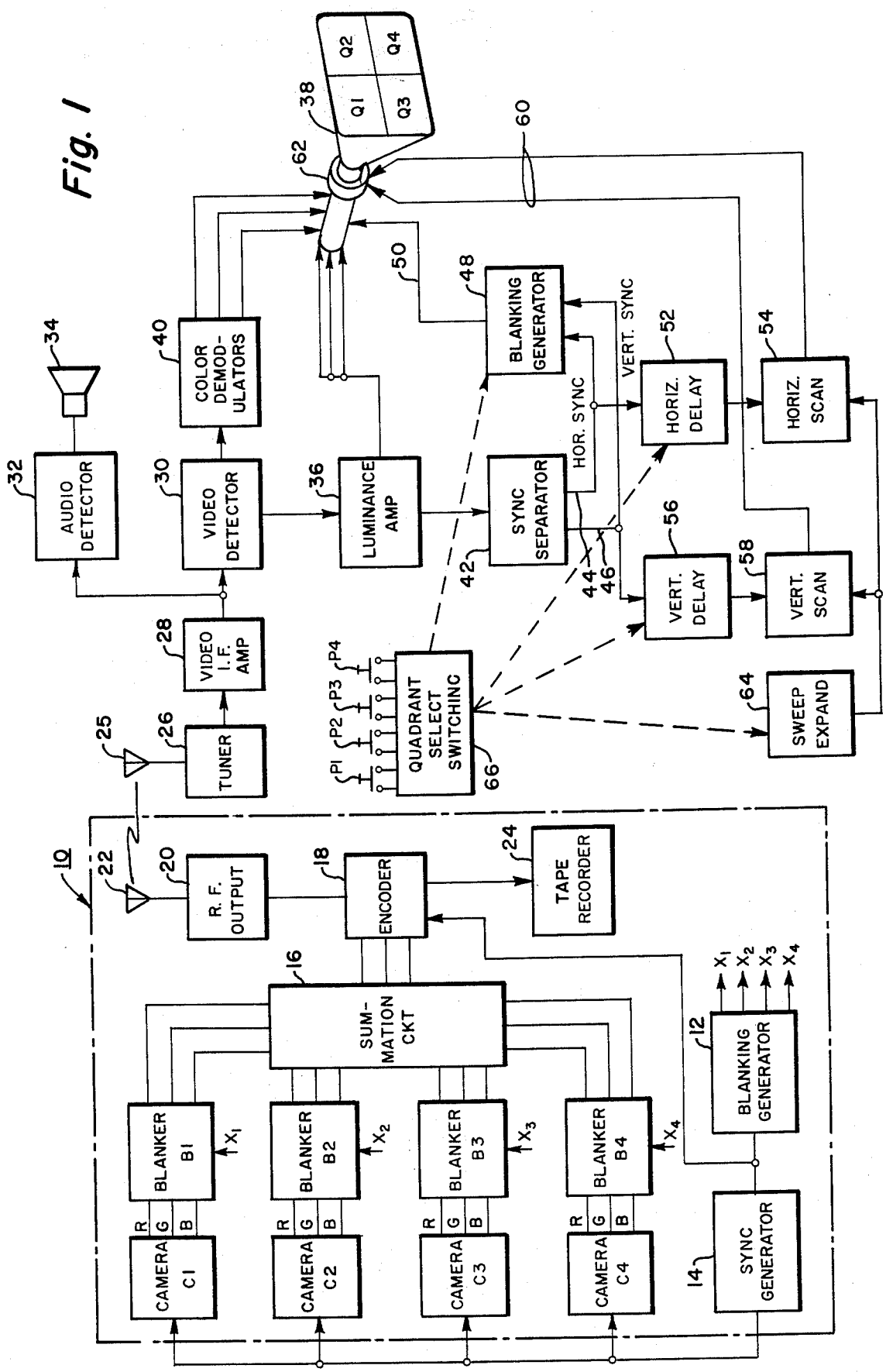

United States Patent [19]

Justice et al.

[11] 3,953,666

[45] Apr. 27, 1976

[54] TELEVISION SYSTEM FOR SIMULTANEOUSLY TRANSMITTING AND RECEIVING A PLURALITY OF INDEPENDENT PICTURES ON A SINGLE CARRIER SIGNAL

[75] Inventors: James W. H. Justice, Murrysville; George F. Newell, Pittsburgh, both of Pa.

[73] Assignee: Westinghouse Electric, Corp., Pittsburgh, Pa.

[22] Filed: May 25, 1973

[21] Appl. No.: 364,161

[52] U.S. Cl. ............................ 178/5.6; 178/DIG. 23; 358/12
[51] Int. Cl. ............................................. H04n 7/00
[58] Field of Search ............... 178/5.6, DIG. 23, 6.8, 178/7.7, DIG. 6, 7.5 SE

[56] References Cited
UNITED STATES PATENTS

| | | | |
|---|---|---|---|
| 3,180,931 | 4/1965 | Morchand | 178/5.6 |
| 3,256,386 | 6/1966 | Morchand | 178/5.6 |
| 3,654,386 | 4/1972 | Baum | 178/7.5 |
| 3,697,678 | 10/1972 | Belleson | 178/DIG. 6 |
| 3,713,000 | 1/1973 | Driskell et al. | 178/7.5 |

FOREIGN PATENTS OR APPLICATIONS
755,824  8/1956  United Kingdom

*Primary Examiner*—Howard W. Britton
*Assistant Examiner*—John Godfrey
*Attorney, Agent, or Firm*—M. P. Lynch

[57] ABSTRACT

Apparatus for transmitting and receiving a plurality of separate pictures or scenes on a single television carrier signal such that a different picture appears in each quadrant of a television receiving tube, and including means for blanking out all but one quadrant and for centering and expanding that quadrant to fill the entire screen of the receiving tube. This is accomplished by separating the sync signals from the video, followed by delaying the sync signals and recombining them with the video such that the video portion, representing one quadrant, is essentially centered between horizontal and vertical sync pulses. Expansion of the single quadrant after it is centered on the tube is achieved by increasing the amplitude of the vertical and horizontal sweep waveforms. In one embodiment of the invention, a special receiver is used for centering and expanding a quadrant; while in another embodiment, an adapter is employed which essentially demodulates an incoming signal, separates and delays the sync signals, and recombines them with the video; whereupon the altered video signal is modulated for application to the antenna terminals of a conventional receiver. The invention finds particular utility in educational television systems where a pupil, for example, is required to select a correct answer from one of four presented at the four quadrants of a receiving tube.

4 Claims, 3 Drawing Figures

TELEVISION SYSTEM FOR SIMULTANEOUSLY TRANSMITTING AND RECEIVING A PLURALITY OF INDEPENDENT PICTURES ON A SINGLE CARRIER SIGNAL

BACKGROUND OF THE INVENTION

Systems such as those shown in Morchand U.S. Pat. Nos. 3,180,931 and 3,256,386 have been provided for simultaneously transmitting over a single television channel carrier frequency a plurality of pictures or scenes which are normally displayed in the four quadrants of a television receiving tube. In these systems, one or more of the quadrants can be blanked out by switches at the receiver so that the viewer sees only a selected one or more of the quadrants.

An arrangement of this sort is particularly adaptable for use in educational television systems. Thus, the instructor at a transmitting station may cause different scenes or written material to appear at the four quadrants of a remote receiving tube as viewed by a student. He could then pose a problem via the audio channel of the television system and ask which one of the four quadrants contains the correct answer (i.e., a multiple choice question). By depressing one of four switches at the receiver, the student would then blank out all but one of the four quadrants which he feels contains the correct answer. The instructor would then advise students viewing individual receiving tubes of the correct answer.

Let us assume, for example, that the correct answer is in the fourth quadrant of the picture tube. If the student picked the wrong answer, he would be instructed to depress the switch for the correct quadrant; whereupon the subject matter shown in the correct quadrant would be discussed by the instructor.

Such systems, while usable, are not altogether satisfactory for the reason that the information ultimately studied by the students will be in only one quadrant and one corner of the television picture tube and, of course, one-quarter the size of the tube. As a result, the viewer may have difficulty in reading written material or even in viewing a scene.

SUMMARY OF THE INVENTION

In accordance with the present invention, there is provided a combination including (1) means for detecting frames of video signals wherein each frame includes four different scenes in the four quadrants of a television receiving tube, (2) means coupled to the detecting means for blanking out all but that portion of the video signal between sync pulses which when displayed on the face of the receiving tube comprises one of said four quadrants, and (3) means coupled to the output of the blanking means for centering said one of the four quadrants on the receiving tube face by phase shifting the sync pulses of the video signal. Preferably, means are additionally provided for expanding the quadrant thus centered by, for example, increasing the amplitude of the vertical and horizontal sweep waveforms.

In one embodiment of the invention shown herein, a special receiver is utilized including means for separating and delaying both the vertical and horizontal sync pulses as required, together with means for blanking out all but one of the four quadrants. In another embodiment of the invention, however, a conventional receiver can be used together with an adapter connected between an antenna which receives a remote carrier signal and the antenna terminals of a conventional receiver. In this latter case, the signal is demodulated; the sync and color burst signals are separated; and both delayed before being recombined with the video signal. The recombined video signal including the delayed blanking and color burst signals is then modulated on a carrier signal and applied to the antenna terminals of the conventional television receiver, which can include means for expanding the centered quadrant, to fill the entire receiving tube face.

Figure 2:
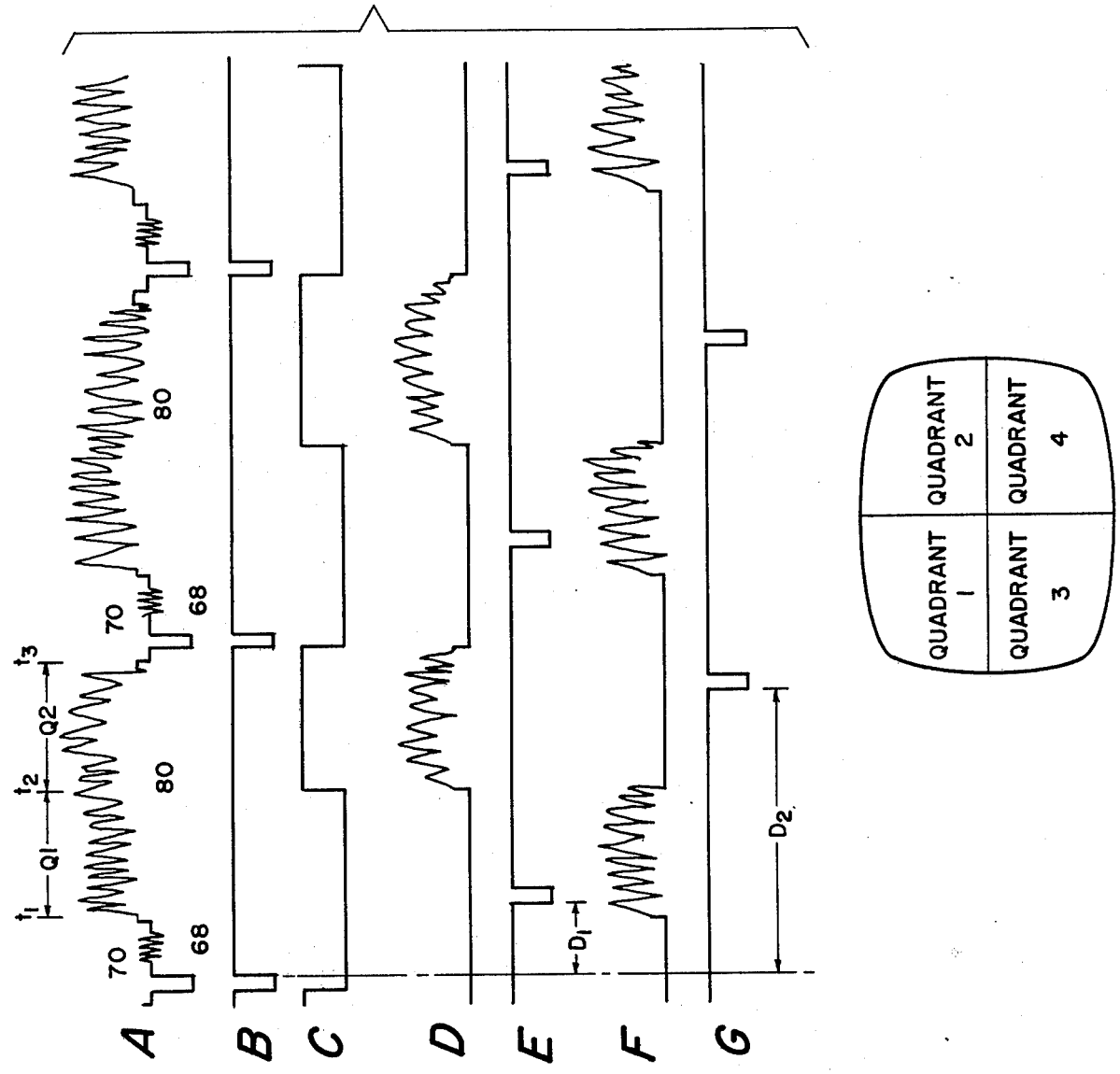
Figure 3:
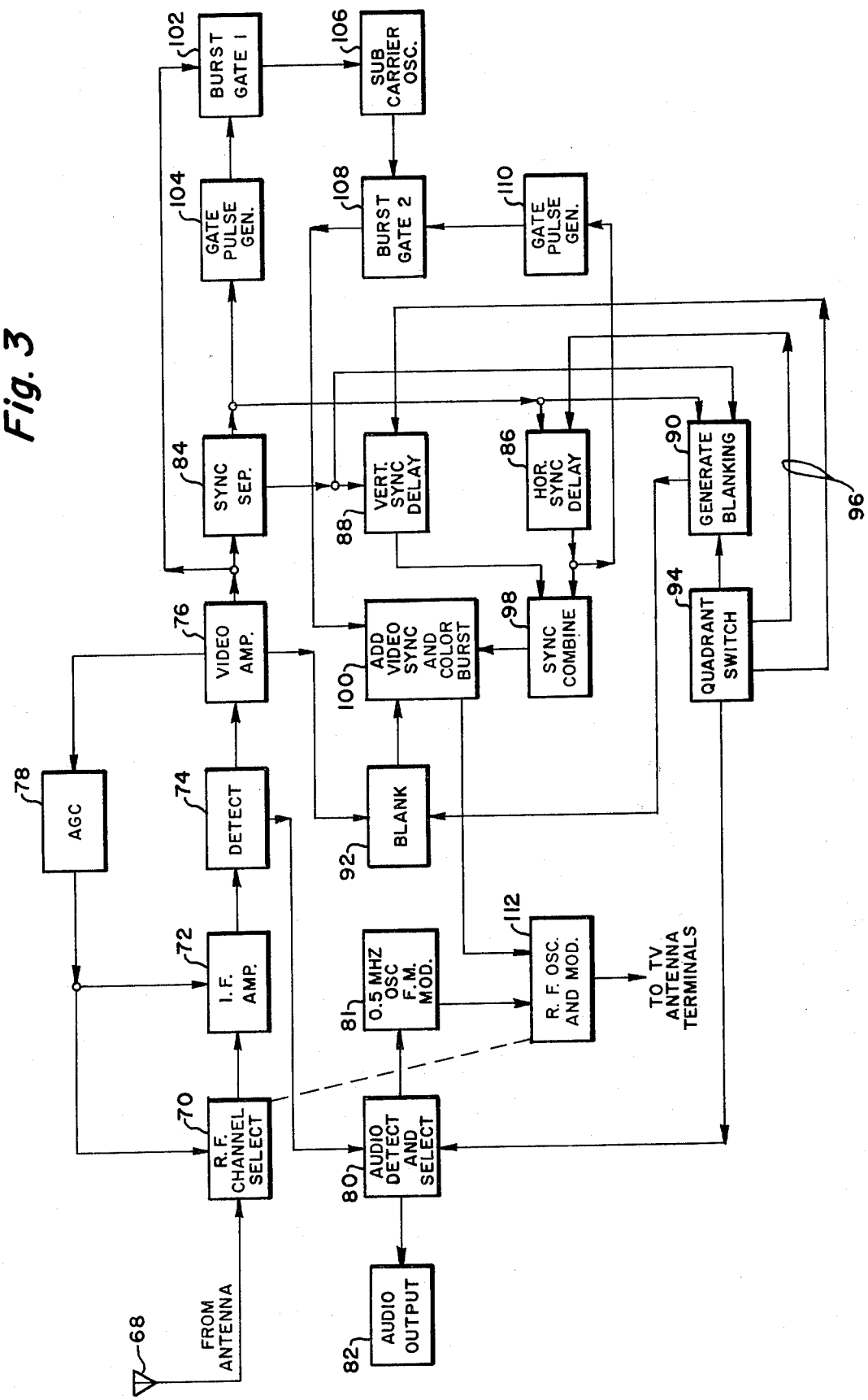

The above and other objects and features of the invention will become apparent from the following detailed description taken in connection with the accompanying drawings which form a part of this specification, and in which:

FIG. 1 is a block diagram of one embodiment of the invention employing a modified television receiver;

FIG. 2 comprises waveforms illustrating the operation of the circuitry of FIG. 1; and FIG. 3 is an illustration of another embodiment of the invention wherein an adapter is interposed between an antenna which receives a television signal from a remote transmitter and the antenna terminals of a conventional television receiver for the purpose of blanking out all but one quadrant of a video frame and for centering that quadrant.

With reference now to the drawings, and particularly to FIG. 1, a television transmitter is shown enclosed by broken lines and identified generally by the reference numeral 10. It includes four cameras C1, C2, C3 and C4 each of which is trained on a different scene. For purposes of the following discussion, it will be assumed that the cameras C1–C4 are color cameras; however it should be understood that conventional monochrome cameras can be used equally as well. The outputs of the cameras C1–C4 comprising red, green and blue color signals are applied to blanking circuits B1, B2, B3 and B4, respectively. The blanking circuits B1–B4, in turn, have applied thereto blanking signals $X_1$, $X_2$, $X_3$ and $X_4$ derived from a blanking generator 12 connected to the transmitter sync generator 14.

The blanking signal applied to blanking circuit B1, for example, will blank out all that portion of a conventional television picture frame except the upper left-hand quadrant. The blanking circuit B2 will blank out all but the upper right-hand quadrant of the frame; blanking circuit B3 will blank out all but the lower left-hand quadrant of the frame; and blanking circuit B4 will blank out all but the lower right-hand quadrant of the frame.

The signals passing through the respective blanking circuits B1–B4 are then summed in a summation circuit 16 and applied to a conventional television transmitting encoder 18 where vertical and horizontal sync pulses are added from the sync generator 14. The result, of course, is that the summation of the outputs of the blanking circuits B1–B4 will be a composite video signal wherein, in each frame, there are four different scenes which will appear at the four quadrants of a television display tube, these four scenes being those on which the cameras C1–C4 are trained. The output of the encoder, in turn, is applied through radio-frequency output circuitry 20 to a transmitting antenna 22. The output of the encoder can also be applied to a tape recorder 24. As thus described, it will be appreciated that apart from the additional cameras and blanking circuits the transmitter 10 is of conventional design.

The signal transmitted from antenna 22 is received by a receiving antenna 25. From antenna 25, the received signal passes through a tuner 26 to a video IF amplifier 28 in accordance with usual procedure. The output of the video IF amplifier, in turn, is applied to a video detector 30 as well as to an audio detector 32 connected to a loud-speaker 34, all in accordance with conventional practice. The output of the video detector 30 is applied to a luminance amplifier 36 which, in turn, will provide an output for the three cathodes of a color television receiving tube 38. The output of the video detector 30 is also applied to color demodulators 38 connected to grids within the receiving tube 38. Again, this is usual procedure.

The output of the luminance amplifier 36 is also applied to a sync separator circuit 42 which separates from the luminance signal horizontal sync pulses which appear on lead 44 and vertical sync pulses which appear on lead 46. These are applied to a blanking generator 48 which can be switched for no blanking of the picture, or can blank out any three of the four quadrants of the picture as desired. For purposes of the present discussion, it will be assumed that the output of the blanking generator 48 is applied to a grid within the receiving tube 38 via lead 50; however it should be understood that it could be applied, for example, to a gate interposed between the luminance amplifier 36 and the cathodes of the tube 38. Depending upon the output of the blanking generator 48, pictures or scenes will appear at all four quadrants Q1, Q2, Q3 and Q4 of the receiving tube 38, or all but one can be blanked out by means of suitable switching, hereinafter described.

The horizontal sync pulses on lead 44 are also applied to a horizontal delay circuit 52 which, in turn, controls the horizontal scan circuit 54 for the tube 38. Likewise, the vertical sync pulses are applied through a vertical delay circuit 56 to a vertical scan generator 58. The scan generators 54 and 58 are connected through leads 60 to the deflection coil or yoke 62 on the receiving tube 38. Also connected to the horizontal and vertical scan circuits 54 and 58, respectively, is a sweep expand circuit 64 which, in effect, acts to increase the amplitude of the horizontal and vertical scan signals once a quadrant has been centered in order to expand that quadrant to fill the entire face of the receiving tube or to any desired size.

The blanking generator 48, the delay circuits 52 and 56, and the sweep expand circuit 64 are all controlled by a quadrant select switching network 66. This may be provided with four pushbuttons P1–P4. These will be accessible to the viewer of the tube 38 such that by depressing pushbutton P1, for example, the circuit 66 will be actuated to blank out all but the first quadrant Q1. Similarly, if pushbutton P3 should be depressed, all but the third quadrant Q3 will be blanked out. The quadrant select switching circuit 66 is shown interconnected with the blanking generator of the horizontal and vertical delay circuits and sweep expand circuit by means of broken lines. In this respect, the quadrant select switch can be utilized to physically change the value of components in these various circuits. Alternatively, the same function can be performed electrically in accordance with well-known techniques.

The operation of the circuit of FIG. 1, and particularly the receiving portion thereof, may be understood by reference to the waveforms of FIG. 2. The video waveform for only two complete horizontal scans is shown by waveform A. This waveform comprises a conventional video waveform including sync pulses 68, a color burst 70 and the chrominance and luminance portion 80. No vertical sync pulses are shown since, as will be understood, they occur at a much lower frequency than the horizontal sync pulses 68.

Assuming that waveform A occurs while the electron beams of the tube 38 are scanning the upper half of the face of tube 38, the chrominance signal between the times $t_1$ and $t_2$ will represent one line of the scene displayed on quadrant Q1; while that portion between times $t_2$ and $t_3$ will represent a line of the scene displayed in quadrant Q2. Let us assume, for example, that it is desired to blank out all but the second quadrant Q2 and to center that quadrant. In this case, the pushbutton P2 is depressed. The separated horizontal sync signals appearing on lead 44 are illustrated in FIG. 2 as waveform B. When these are applied to the blanking generator 48 with pushbutton P2 depressed, a blanking signal appearing as waveform C in FIG. 2 will be generated. This blanking signal, applied to the tube 38, will blank out the first half of the video signal such that it will appear as waveform D wherein only the portion of the chrominance signal representing quadrant Q2 remains. If this were all that were done, the quadrant Q2 would continue to remain in the upper right-hand portion of the tube 38.

In order to center the quadrant Q2 along the horizontal axis of the tube 38, the horizontal sync pulses (waveform B) are delayed in an amount $D_1$ in horizontal delay circuit 52. In this manner, the delayed sync pulses (waveform E) are now equally spaced on opposite sides of the chrominance signal (waveform D) representing the quadrant Q2. As a result, the scene shown in quadrant Q2 is shifted horizontally to the center of the tube 38.

The action of the vertical delay 56 is the same. That is, since the quadrants Q3 and Q4 are now blanked out, only one half the normal video signal for a complete frame is applied to the tube 38. By delaying the vertical sync pulses on either side of the remaining picture signal, the scene in quadrant Q2 can be centered vertically on the tube 38. Thus, after delaying both the horizontal and vertical sync pulses, the scene on quadrant Q2 will be shifted directly to the center of the tube 38.

It now remains to expand the quadrant Q2 to fill the entire face of the tube 38. This is accomplished by way of the sweep expand circuit 64 which, in effect, increases the amplitude of the vertical and horizontal scan signals from circuits 54 and 58. In effect, it causes the electron beam to move off the face of the tube on each side in both the horizontal and vertical directions. In this way, the scene is expanded. The resolution of the picture of course, is reduced compared to that of a conventional picture since the number of horizontal scanning lines is now reduced to one half the normal number for a television picture frame. However the resolution is good enough for most purposes.

The foregoing discussion, of course, assumed that all of the quadrants are blanked out except quadrant Q2. If quadrant Q2 or Q4 is blanked out, the resulting color signal will appear as waveform F in FIG. 2. In this case, the separated sync pulses must be delayed by a time delay $D_2$ (waveform G) which is greater than the time delay $D_1$ in order to center the picture signal for the quadrant being used. The same is true for the vertical sync pulses. When quadrant Q3 or Q4 is being centered, the delay in the vertical sync pulses will be less than when quadrant Q1 or Q2 is being centered since the picture signal for quadrants Q1 and Q2 leads that for quadrants Q3 and Q4.

With reference now to FIG. 3, another embodiment of the invention is shown which comprises an adapter interposed between an antenna 68 which receives a signal from the remote transmitter and the antenna terminals of a conventional television receiver. It will be appreciated, of course, that the receiver shown in FIG. 1 is not conventional. In the case of FIG. 3, the modulated carrier signal again passes through a tuner or RF channel select circuit 70 to a video IF amplifier 72 and thence to a detector 74 where the modulated carrier signal is demodulated to derive a video signal which is applied to video amplifier 76. A feedback from the video amplifier passes through an automatic gain control circuit 78 to the intermediate frequency amplifier 72 and the tuner 70 in accordance with usual practice. In addition, a modulated audio signal in the detector 74 passes through an audio detector and selector 80 and thence to an audio output or loudspeaker 82. Alternatively, the detected audio can be remodulated in FM modulator 81. The video output signal from amplifier 76 is applied to a sync separator 84 which separates the horizontal and vertical sync signals and applies them to a horizontal sync delay circuit 86 and a vertical sync delay circuit 88, respectively.

At the same time, the separated horizontal and vertical sync pulses are applied to a blanking generator 90 in a manner similar to that shown in FIG. 1. Thus, the vertical and horizontal synchronizing signals, derived from the sync separator 84, are used to synchronize the blanking generator 90 which, in turn, is connected to blanking circuit 92 to blank out the unwanted quadrants of the picture obtained from the video amplifier 76. The quadrant select switch 94 again determines the phase of the blanking and also the delay to be introduced in the horizontal and vertical sync signals necessary for centralization of the selected picture. In this respect, the quadrant switch 94 is connected through leads 96 to the horizontal and vertical sync delay circuits 86 and 88, respectively. In contrast to the arrangement shown in FIG. 1, electrical signals are utilized to vary the delays rather than manual adjustments of a circuit element. To obtain a composite video signal containing only one quadrant, the delayed horizontal and vertical sync signals are applied to a sync combine circuit 98 where they are combined with the blanked video signal from blanking circuit 92 in circuit 100.

In a received color video signal, it is necessary to have a burst signal of subcarrier reference with which to lock the locally generated subcarrier oscillator (i.e., a color burst such as burst 70 shown in waveform A of FIG. 2). This is necessary to permit synchronous detection of the color information. When the horizontal sync pulses are shifted or delayed to permit centralization of the selected quadrant, the position of the incoming color burst relative to the shifted horizontal sync pulse is also changed. However, when the signal is applied to the antenna terminals of a conventional television receiver, it is necessary to maintain the correct relative positions of the horizontal sync pulses and the color burst for operation of the color receiver. Hence, the color burst must also be shifted by the same amount as the horizontal sync signals. Otherwise, it will not be possible to demodulate the color information in a conventional television receiver since this depends upon the correct phasing of the horizontal sync pulses and the color burst. Note that this is not a requirement in the circuit of FIG. 1 since signals applied to the color demodulators in the circuit of FIG. 1 do not have delayed sync and color burst signals.

FIG. 3 shows one manner in which phase shifting of the color burst may be achieved. The output of the video amplifier 76 is applied to a first burst gate 102. The horizontal sync pulses from sync separator 84 are utilized to trigger a pulse generator which, in turn, produces a gating pulse for opening the gate 102 at the position of the color burst on the received video signal. The separated burst appearing at the output of gate 102 is then utilized to lock a local subcarrier oscillator which produces an output signal having a frequency corresponding to that required by the color burst. This, then, is applied to a second burst gate 108 which is gated on by a gate pulse generator 110 triggered by the output of the horizontal sync delay circuit 86. Hence, the color burst at the output of circuit 108 will now be in the correct phase position with respect to the delayed horizontal sync pulses; and this is added to the composite video signal in circuit 100 along with the blanked video signal and the delayed vertical and horizontal sync pulses. The resulting composite video signal with the added burst and vertical and horizontal sync delays is then applied, along with the FM modulated audio from circuit 81, to an RF oscillator and modulator 112 which may be mechanically interconnected to the tuner 70. Circuit 112 modulates the video and audio signals with the same carrier frequency as that which passed through the tuner 70. Alternatively the video and audio signals may modulate a fixed predetermined carrier frequency. The resulting signal is applied to the antenna terminals of a conventional television receiver.

Switch 94 can cause the audio signal to be applied to either element 82 or element 81. If desired, the switch can also be connected through leads, not shown, to the vertical and horizontal sweep circuits in the TV receiver for expanding the thus-centered quadrant.

Although the invention has been shown in connection with a certain specific embodiment, it will be readily apparent to those skilled in the art that various changes in form and arrangement of parts may be made to suit requirements without departing from the spirit and scope of the invention.

We claim as our invention:

1. An apparatus for receiving a plurality of separate pictures or scenes on a single television carrier signal such that a different scene appears in each quadrant of a single television receiving tube, the combination of means for detecting frames of video signals wherein each frame includes four different scenes in the four quadrants of a single television receiving tube, means coupled to said detecting means for blanking out all but that portion of the video signal which when displayed on the face of the receiving tube comprises one of said four quadrants, a sync separator for separating vertical and horizontal sync signals from said video signal, means for delaying both the vertical and horizontal sync signals, means for recombining the delayed vertical and horizontal sync pulses with the blanked video signal, means for recombining a radio-frequency carrier signal with the recombined video signal and blanking pulses, and means for applying the thus-modulated signal to the terminals of a television receiver.

2. The apparatus of claim 1 including means for expanding the centered quadrant on the receiving tube face by varying the vertical and horizontal scan signals applied to said receiving tube.

3. The apparatus of claim 1 wherein said video signal is a color video signal and including means for separating the color burst from said video signal, means for delaying said color burst in an amount equal to the delay of the horizontal sync pulses, and means for recombining the delayed color burst with said video signal and said delayed sync pulses prior to modulation of said radio-frequency carrier signal.

4. The apparatus of claim 3 wherein said means for delaying the color burst includes a first burst gate, a gate pulse generator responsive to undelayed horizontal sync pulses for opening said first burst gate in phase with a color burst, a subcarrier oscillator driven by the color bursts passing through said first burst gate, a second burst gate, and a second gate pulse generator triggered by delayed horizontal sync pulses for opening said second burst gate to produce color bursts which are delayed in an amount equal to the delay of said horizontal sync pulses.

* * * * *